United States Patent [19]

Dolgov et al.

[11] 4,246,106
[45] Jan. 20, 1981

[54] METHOD FOR REFINING MELTS FROM SOLID IMPURITIES

[76] Inventors: Anatoly V. Dolgov, Morskoi prospekt, 36, kv. 30; Leonid V. Konovalov, ulitsa Permskaya, 1; Leib B. Perkis, ulitsa Geodezicheskaya, 23, kv. 53; Stanislav L. Deev, ulitsa Kirova, 80, kv. 44; Vitaly E. Dyakov, ulitsa Petukhova, 132, kv. 65; Alexandr E. Semenov, ulitsa Zorge, 133, kv. 33, all of Novosibirsk; Evgeny T. Bauer, ulitsa Shirotnaya, 21/4, kv. 23, Fergana, poselok Kirgili; Serafim N. Suturin, ulitsa Savvy Kozhevnikova 2, kv. 22, Novosibirsk, all of U.S.S.R.

[21] Appl. No.: 700,133

[22] Filed: Jun. 28, 1976

Related U.S. Application Data

[60] Continuation of Ser. No. 584,927, Jun. 9, 1975, abandoned, which is a continuation of Ser. No. 469,903, May 14, 1974, abandoned, which is a division of Ser. No. 358,613, May 9, 1973, abandoned, which is a division of Ser. No. 220,847, Jan. 26, 1972, Pat. No. 3,780,864.

[30] Foreign Application Priority Data

| Nov. 20, 1967 [SU] | U.S.S.R. | 1197564 |
| Nov. 4, 1969 [SU] | U.S.S.R. | 1374168 |
| Mar. 2, 1971 [SU] | U.S.S.R. | 1629152 |
| Mar. 31, 1971 [SU] | U.S.S.R. | 1636140 |

[51] Int. Cl.$^3$ .................. B01D 35/02; B01D 35/18
[52] U.S. Cl. .................... 210/774; 210/780; 210/781; 75/63; 210/791
[58] Field of Search ............ 210/370, 359, 496, 510, 210/488, 152, 251, 77, 78, 242, 71, 79; 75/70, 86, 68, 93, 63, 77, 78

[56] References Cited

U.S. PATENT DOCUMENTS

| 226,271 | 4/1880 | Blaisdell | 210/488 |
| 1,736,349 | 11/1929 | Langenberg | 210/370 |
| 2,448,157 | 8/1948 | Schneider | 210/359 X |
| 3,524,548 | 8/1970 | McDonald et al. | 210/496 X |
| 3,907,962 | 9/1975 | Ogiso | 210/510 X |

Primary Examiner—Frank A. Spear, Jr.
Attorney, Agent, or Firm—Holman & Stern

[57] ABSTRACT

The method provides for filtration in the field of centrifugal forces generated in a filter immersed into a layer of a melt to be refined, with the solid impurities accumulating in the filter being strained from the residual melt beyond the layer of the melt to be refined.

8 Claims, 9 Drawing Figures

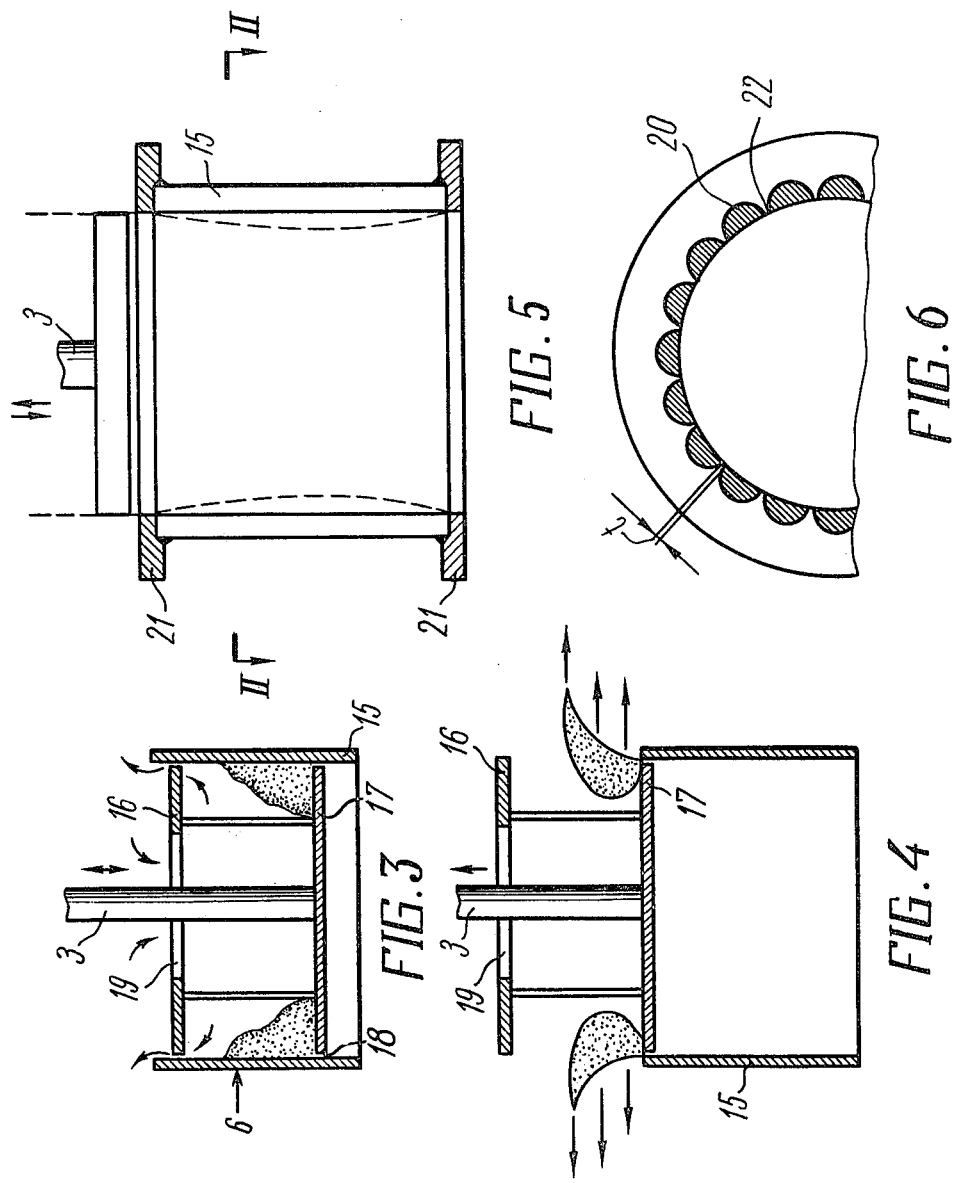

METHOD FOR REFINING MELTS FROM SOLID IMPURITIES

This is a continuation of application Ser. No. 584,927 filed June 9, 1975, now abandoned, which in turn is a continuation of Ser. No. 469,903, filed May 14, 1974, now abandoned, which is a division of Ser. No. 358,613, filed May 9, 1973, now abandoned, which is a division of Ser. No. 220,847, now U.S. Pat. No. 3,780,864.

BACKGROUND OF THE INVENTION

The invention relates to non-ferrous metallurgy and is used for refining such molten metals as tin, lead, bismuth, zinc, and aluminum alloys from solid impurities, as well as for removing solid impurities from molten sulfur.

Known in the art are pyrometallurgical methods and apparatus for refining molten metals from insoluble impurities. These methods are based on gravity segregation, with the solid particles floating to the surface wherefrom they are skimmed. For example, tin is separated from iron by segregation after admixing carbon. Arsenic is separated from tin in the form of an aluminum compound insoluble in tin. Lead is refined from copper by segregation of copper sulfides, with the melt being treated with elementary sulfur.

In the case of segregational removal of insoluble impurities, a significant amount of the metal to be refined is removed together with the skimmings, thus reducing the direct extraction of the product. In this connection, filtrational methods of metal refinement have been suggested. For example, known in practice is a method of filtrating molten sulfur from solid arsenic compounds by a ceramal filter under vacuum.

Also known are a method and an apparatus for centrifugal filtration of metals. In this apparatus, the crude metal is poured into a rotating filter and is filtered off through slits provided in the periphery of the filter. The refined metal spills down the metal receiver and the solid particles are arrested at the slits. The centrifugal filtration of metal in such an apparatus enables the separation of the insoluble impurities with a lesser loss of the base metal with the skimmings as compared to the ordinary segregational methods.

However, the method and apparatus for centrifugal filtration of melts have the following disadvantages:

It is difficult to maintain the specified temperature of the filter casing and of the starting melt.

The solid particles floating to the surface of the starting melt are not uniformly poured into the apparatus, thus complicating its operation.

In the beginning of each filtration cycle, while the filter is not yet clogged with the solid sediment, the fine particles of the impurities penetrate through the filter slits and pass into the product. As the slits are being clogged, the product purity rises. Thus, the purity of the product metal is not uniform within one cycle and over the whole period of refinement.

During the operation of the apparatus, air is sucked into the rotating filter together with the metal flow which intensifies metal oxidation.

These disadvantages are caused by the fact that the filter is separated from the bulk of the metal which is fed for filtration in batches or in a flow with a varying content of the segregating impurities.

SUMMARY OF THE INVENTION

It is an object of the present invention to provide a method for refining melts from solid impurities, which secures a more complete removal of the solid impurities from the melt, and which reduces the melt losses with the filtered off solid impurities.

Another object of the invention is to depress oxidation of the melt being refined, and to ensure stable temperature conditions of the process.

With these and other objects in view, in a method for refining melts from solid impurities by filtration in the field of centrifugal forces generated in the filter, according to the invention, in the course of filtration, the filter is immersed into a layer of melt being refined which is continuously admitted into the filter and, after separation of the solid impurities settling in the filter, is again admitted into the melt layer, while the solid impurities accumulating in the filter are strained off the remaining fluid melt outside the layer of the melt being refined. This secures a more complete removal of the solid impurities (including those finely divided ones) from the melt.

It is desirable to conduct the process of filtration with the melt temperature being lowered. This permits the refining of viscous melts with a high content of partially soluble impurities.

Advantageously, formed on the surface of the melt prior to filtration should be a layer of a liquid flux into which the filter is immersed so that the melt to be refined is admitted into the filter from under the flux layer, and the refined melt is admitted into the layer of flux, whereupon the solid impurities settled in the filter are washed to remove the remaining melt by circulating the liquid flux through the filter. This prevents oxidation of the refined melt and reduces losses of the melt with the solid sediment.

An apparatus for realizing this method comprises a bath for the melt and a rotor at whose lower end a filter is secured coaxially therewith, the rotor being disposed above the melt bath and having a drive unit for immersing the filter into the melt. This enables the refining process to be conducted directly in the melt bath, and secures stable temperature conditions of the process.

The filter in the apparatus can be defined by two conically shaped dishes which face each other with their respective bases or bottoms so as to provide a clearance therebetween constituting a filtering slit, and one of the dishes having apertures at the cone apex to admit the melt. This simipifies the design of the filter, and provides for a high quality of filtration through regulating the size of the filtering slit.

The filter can also be defined by a cylinder in which are mounted two disks arranged parallel to each other, the disks being capable of reciprocatory movement along the axis of the cylinder and being rigidly connected to with one another, one of the disks having an aperture the melt, and the clearances between the disks and the cylinder wall forming the filtering slits. This arrangement also simplifies the filter design, and prevents clogging of the filter in the course of its operation.

In the wall of the cylinder, along its generatrices, there can be provided filtering slits which raise the filter efficiency thereby maintaining high quality of the melt refinement.

To keep the filter below the melt level during the refining process, the filter can be suspended on a pan floating on the melt surface.

BRIEF DESCRIPTION OF THE DRAWINGS

The invention is now exemplified by a description of a particular illustrative embodiment thereof with references to the appended drawings, wherein:

FIG. 3 is a longitudinal sectional view of a filter defined by a cylinder with disks, FIG. 4—is a view similar to FIG. 3 in a position of discharging the solid sediment, FIG. 5 is a longitudinal sectional view of a cylinder having filtering slits;

FIG. 6 is a sectional view taken along line II—II in FIG. 5;

DETAILED DESCRIPTION OF THE PREFERRED EMBODIMENT

Figure 1:
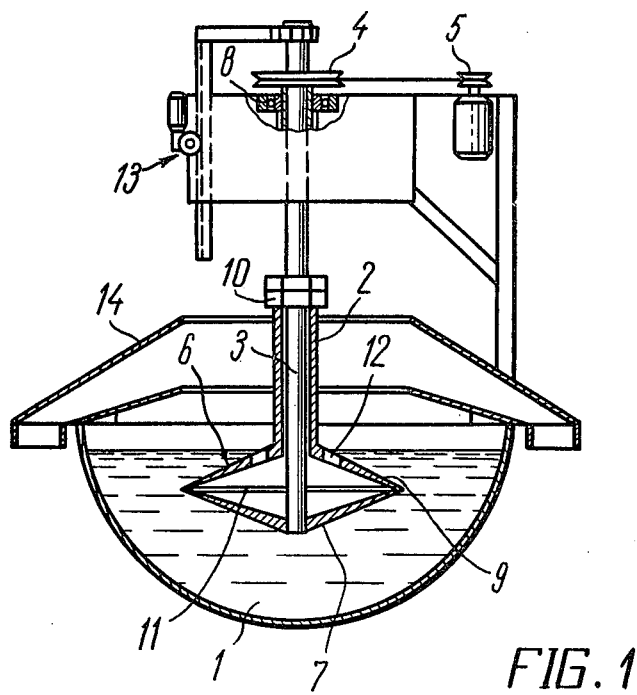
FIG. 1 is a longitudinal section of the apparatus for realizing the inventive method, the apparatus including a filter having two dishes.

The apparatus comprises a bath 1 (FIG. 1) with the melt, above which there is vertically mounted a rotor 2 whose shaft 3 is, through a drive 4, connected with an electric motor 5. Rigidly attached to the bottom portion of the rotor 2 is a filter 6 immersed into the melt. The filter 6 comprises two conically shaped dishes 7 and 9 whose bases or bottoms face each other. The lower dish 7 (FIG. 2) is fixed on the shaft 3 which is seated in the race of a bearing 8 through a sliding key.

The upper dish 9 is rigidly connected to the bottom portion of the rotor 2, and can move along the shaft 3. The dish 9 can be fixed in a specified position by means of a mechanism 10. The clearance between the dishes 7 and 9 forms a filtering slit 11 whose width is regulated by the mechanism 10. One of the dishes, for example, the upper dish 9, has apertures 12 at the top of the cone to admit the melt into the filter.

The rotor 2 with the filter 6 is connected with a mechanism 13 for effecting their reciprocation along their longitudinal axis.

Fixed on the melt bath 1 is a cylindrical bin or receptacle 14 to collect the filtered off solid impurities with the bin having a central hole to allow the filter 6 to pass therethrough.

The apparatus can be provided with a filter of another design in which the filter 6 may comprise a hollow cylinder 15 (FIGS. 3 and 4) rigidly connected to the rotor 2. Within the cylinder 15 are mounted upper and lower disks 16 and 17 respectively which are rigidly seated on the shaft 3. The clearances between the disks 16 and 17 and the wall of the cylinder 15 constitute filtering slits 18. One of the disks, the upper disk 16, is provided with a hole 19 to admit the melt.

The wall of the cylinder 15 (FIGS. 5 and 6) can be formed by round rods 20 which are peripherally fixed in flanges 21 and are spaced apart at the inner diameter of the filter 6, to form vertical clearances between the rods 20 serving as additional filtering slits 22.

Figure 7:
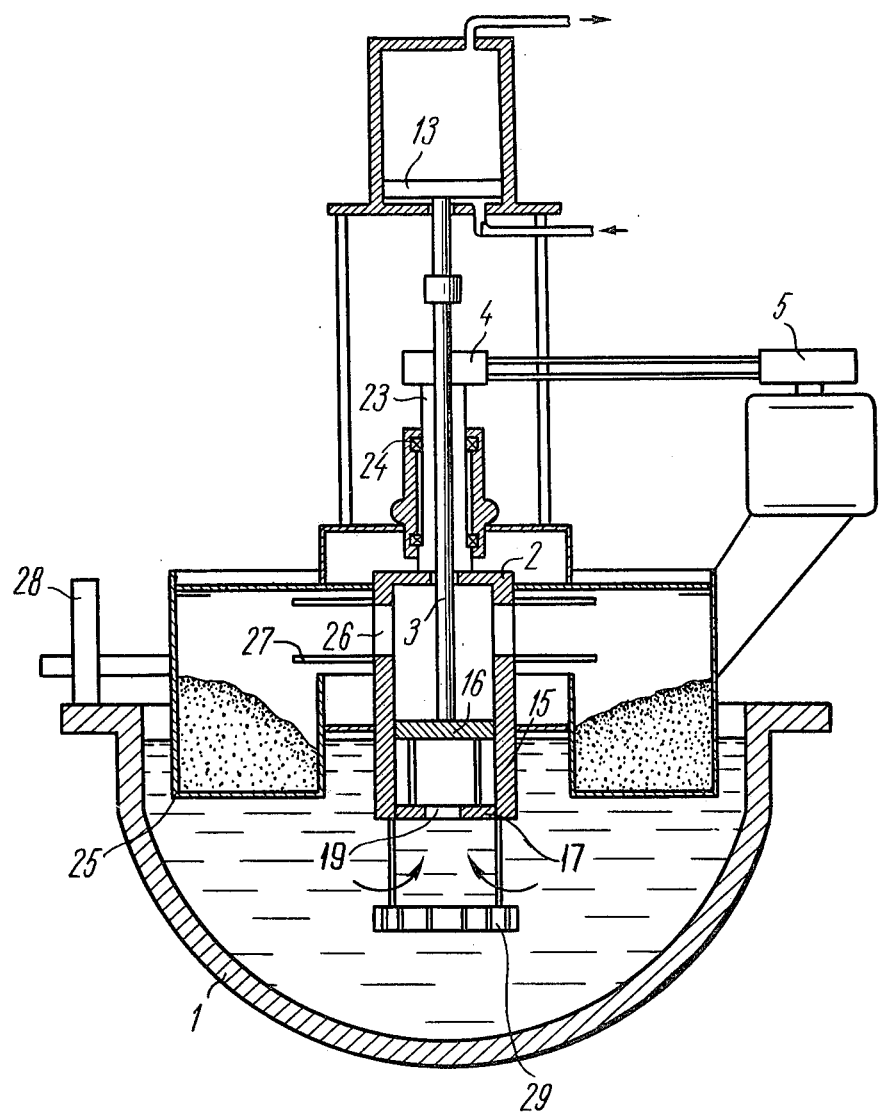
FIG. 7 is a longitudinal sectional view of an apparatus with a floating pan.

The shaft 3 (FIG. 7), on which are rigidly seated the disks 16 and 17, is connected with the drive 13 for effecting vertical reciprocatory movement, and with the drive 4 for effecting rotational movement from the electric motor 5.

To retain the filter 6 below the level of the melt, the rotor 2 is, by means of a sleeve 23 (FIG. 7) and bearings 24 attached to a pan 25 floating on the surface of the melt.

The pan 25 is a vessel whose side walls are formed by two cylinders and the pan 25 also serves to collect the filtered off solid impurities discharged therein through ports 26 along guides 27.

To prevent rotation of the pan 25, mounted on bath 1 is a stop 28. Attached to the filter 6 can be an impeller 29 for mixing the melt.

Figure 8:
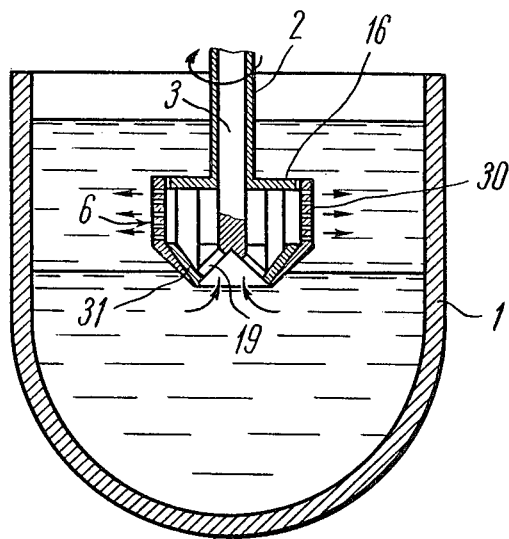
FIG. 8 is a longitudinal sectional view of a filter being immersed in flux.
Figure 9:
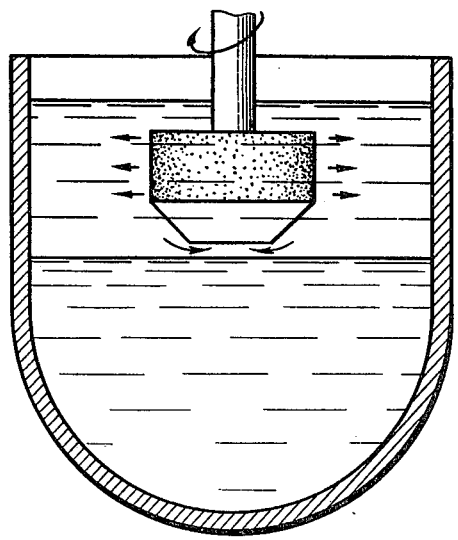
FIG. 9 is a view partly in elevation and partly in section of the filter of FIG. 8 at; the moment of washing through the solid sediment by the flux.

In the described apparatus, the filter 6 can be made in the defined by a perforated drum 30 (FIG. 8) inside of which is placed a knife 31 rigidly connected to the disk 16 seated on the rotor 2. The knife 31 is intended to clean the filter 6 from the settled solid impurities.

Figure 2:
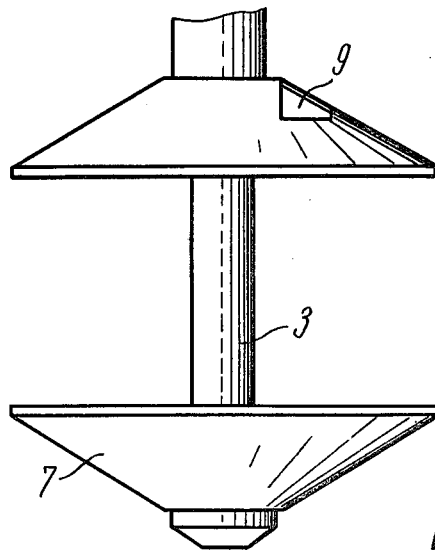
FIG. 2 is a side view of a filter with conical dishes being moved apart.

The apparatus operates as follows:

The rotating filter 6 is immersed into the heated melt bath 1 (FIG. 1). As the filter 6 rotates in the melt, the latter is, together with the solid particles, entrained through the holes 12 into the filter 6.

Under the section of centrifugal forces, the fluid melt is strained out of the filter 6 through the filtering slit 11, being thus separated from the solid impurities and ejected into the rest of the melt.

Multiple circulation of the melt through the filter 6 results in a mass of solid impurities accumulating at the filtering slit 11 and, in turn, serving as a filter for the finer particles.

After the solid impurities fill the inner space of the filter 6, the latter together with the rotor 2, without stopping their rotation, are raised by the lifting mechanism 13, above the melt level, where, under the effect of centrifugal forces, the solid impurities are filtered clear of the remaining fluid melt. Then the filter 6 is lifted to the bin 14, the mechanism 10 regulating the clearance of the slit 11 between the dishes 7 and 9 is disconnected, and the latter are taken apart (FIG. 2) to a clearance of 3-10 cm. As a result thereof the solid impurities are under the effect of centrifugal forces thrown aside into the bin 14.

Thereupon the conical dishes 7 and 9 are moved towards each other by activating the mechanism 10, and the filter 6 is lowered into the melt.

The cycle is repeated until the melt is sufficiently cleared from the impurities.

In another design of the filter 6 (FIGS. 3 and 4), the melt is, through the hole 19, sucked into the cylinder 15, from which under the effect of centrifugal forces, it is strained through the slits 18, with the solid sediment remaining inside the cylinder 15.

At this time, the disks oscillate along the walls of the cylinder 15 to a length of 2-3 cm. As the disks 16 and 17 move down, filtration occurs mainly through the slit 18 between the lower disk 17 and the wall of the cylinder 15, and when they move upward, it occurs through the slit 18 between the upper disk 16 and the wall of the cylinder 15.

Thus, the filtering slits 18 are periodically cleared from the solid sediment, which results in the efficiency of the filter 6 being maintained at a constant level.

To raise the efficiency of the filter, the number of the filtering slits is increased. For example, the cylinder 15 (FIGS. 5 and 6) can be provided with longitudinal filtering slits 22.

After collecting in the filter a sufficient amount of solid impurities, the disks 16 and 17 (FIG. 7), without stopping their rotation, are lifted by the mechanism 13 up to the level of the discharge ports 26 through which under the effect of centrifugal forces, the solid impurities are thrown aside along the guide disks 27 into the pan 25. To preclude rotation of the pan 25, the stop 28 is mounted on the bath.

To refine the melt from heavy impurities precipitating to the bottom, the melt is stirred by the impeller 29 fixed under the filter 6.

The proposed method of refining can be used to refine tin from iron and arsenic, lead from copper, zinc from iron, and sulfur from arsenic compounds.

When refining a metal, for example, tin having a large content of partially soluble impurities (for example, arsenic), the apparatus allows conducting the process with the melt temperature being gradually reduced to about 5°–10° C. above the crystallization point of the melt. For example, the refinement of molten tin at a temperature of 450°–500° C. enables the production of a solid sediment with a lesser content of tin (45–50%), since at high temperatures the metal has a small viscosity and freely passes through the filter.

However, at high temperatures (450°–500° C.) the impurities are more soluble, than at low ones (250°–240° C.). Hence with a fouler metal is better to start filtrating at a higher temperature, and then reduce the temperature as the proportion of impurities drops. At a temperature of 5°–10° C. above the crystallization point, maximum removal of the impurities will occur.

The apparatus permits refining molten metal from solid impurities under a liquid flux layer, for example, refining zinc from iron under a layer of zinc chloride.

In this case, the filter 6 (FIG. 8,9) is immersed into molten flux, and the source melt is admitted through the inlet ports 19 from under the flux layer.

Through the inlet port 19 the melt enters the filter, from which under the action of centrifugal forces, it is strained through the filtering slits into the flux layer. After a sediment of solid impurities has accumulated inside the filter, the latter is lifted so much, that sucked through the inlet port 19 into the filter should be liquid flux which intensely washes through the sediment of solid impurities removing therefrom the residue of the melt being refined.

Thereupon, the filter is raised over the flux surface, the liquid flux is squeezed out from the sediment, and the latter is ejected in the described way.

The proposed method permits lowering the melt losses with the solid sediment and during removal of the solid impurities from the molten metal, and in some cases reducing the consumption of reagents introduced into the melt to form insoluble impurities.

For example, the proposed method make it possible to refine tin with the final product comprising 0.005% of iron, and 0.08% of arsenic, with the amount of the solid sediment being reduced by 4 to 6%, the direct extraction of tin raised by 4.78%, and the tin losses cut by 0.2%. The consumption of aluminium to refine tin from arsenic drops 2.5 times.

What we claim is:

1. A method for refining a melt from solid impurities by centrifugal force filtration comprising the steps of: immersing a filter having a cavity, at least one aperture and at least one filtering slit into a bath of a melt containing solid impurities; rotating the immersed filter to continuously admit the melt containing the solid impurities through the aperture into the cavity of the rotating filter, to discharge the melt from the filter cavity through the filtering slit and to accumulate the solid impurities in the filter cavity at the filtering slit; removing the rotating filter from the bath; and discharging the accumulated solid impurities from the rotating filter.

2. The method as claimed in claim 1, wherein larger solid impurities accumulated at the slit collect smaller solid impurities.

3. The method as claimed in claim 1, wherein during the step of removing the rotating filter from the bath, any melt remaining in the filter cavity is discharged from the filter through the filtering slit.

4. The method as claimed in claim 3, wherein any melt remaining in the filter cavity, during the step of removing the rotating filter from the bath, is discharged into the bath.

5. The method as claimed in claim 3, wherein the accumulated solid impurities are discharged outside the bath.

6. The method as claimed in claim 1, wherein the steps of immersing the filter into the bath, rotating the immersed filter, removing the rotating filter from the bath and discharging the accumulated solid impurities from the rotating filter are repeated more than once.

7. The method as claimed in claim 1, wherein the temperature of the bath is gradually reduced to from 5 to 10° C. above the crystallization point of the melt.

8. The method as claimed in claim 1 further comprising the steps of: providing a layer of liquid flux on top of the bath of the melt containing the solid impurities, wherein the filter is immersed below the layer of the flux, the melt containing the solid impurities is admitted through the aperture into the filter cavity from under the flux layer and the melt is discharged from the filter cavity through the filtering slit into the flux layer; and raising the rotating filter to admit liquid flux through the aperture into the filter cavity to remove any remaining melt from the accumulated solid impurities.

* * * * *